April 5, 1927.
O. O. ANDERSON
FLOAT VALVE
Filed May 28, 1926
1,623,374
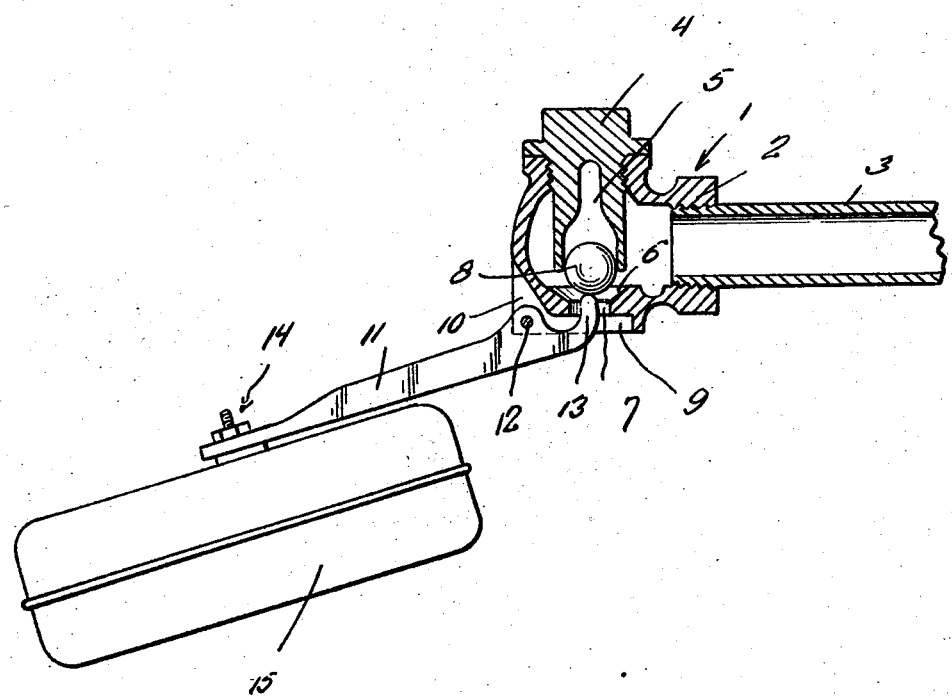
Inventor
O. O. Anderson,
By Clarence A. O'Brien
Attorney Patented Apr. 5, 1927.

1,623,374

UNITED STATES PATENT OFFICE.

OSCAR O. ANDERSON, OF SIOUX RAPIDS, IOWA.

FLOAT VALVE.

Application filed May 28, 1926. Serial No. 112,331.

This invention relates to an improved float valve which is especially, but not necessarily designed for use in a watering trough for animals.

My primary aim is to generally improve upon float valve constructions by providing one of exceptional simplicity of construction, compactness, and convenience of arrangement of parts, practical in operation, easy to clean and repair, and such in construction as to render it advantageous from the manufacturer's view point.

Other objects and advantages of the invention will become apparent from the following description and drawing.

In the accompanying drawing forming a part of this application and in which like numerals are employed to designate like parts throughout the same:

The figure represents a view in section and elevation of a valve constructed in accordance with the present invention.

Referring to the drawing in detail, the reference character 1 designates generally the body or casing of the valve, this is provided with a threaded nipple 2 to which the screw threaded end of a water supply pipe 3 is tapped. The casing may be of any general external configuration, and is preferably provided at its top with a screw threaded opening into which a plug 4 is screw threaded. This plug is provided with an internal shank which is fashioned to form a valve guide 5. This valve guide descends into close proximity to the beveled bottom 6 of the casing. It will be noted that this bottom 6 is provided with an opening 7 forming a discharge port for the water. Also, a gravity closed ball valve 8 is provided for cooperation with the bottom 6 and the port 7. Of course after the valve is closed, the pressure of the water serves to maintain it firmly seated. It will be noted that the casing is so cast as to provide a ring-like extension 9 around the ported bottom 6. Moreover, this depending skirt-like portion or flange is formed at its front to provide a pair of spaced parallel ears 10 between which a float carrying lever 11 is pivoted as at 12. It will be noted at this time that the lever 11 terminates in a curved finger 13 which is rocked through the port 7 to engage the under side of the ball valve for unseating the valve. Also, as at 14, the opposite end of the lever is removably connected with an appropriate float 15.

It is plain to those skilled in the art to which the invention relates that when the device is installed in the water tank or trough and when the float gravitates to the position shown in the drawings by lowering of the water level in the trough, the valve will be unseated and the water in the trough will be replenished. Thus, fresh water will be always on hand for the animals. Inasmuch as the operation and structural features and advantages of the invention are plain, a more lengthy description need not be entered.

Minor changes coming within the field of invention claimed may be resorted to if desired.

Having thus described the invention, what I claim as new and desire to secure by Letters Patent is:—

As a new product of manufacture, a float valve structure for the purpose specified, comprising a valve casing including an attaching nipple and a ported valve seat above which is a screw threaded neck, a plug threaded into said neck and extending into the interior of the casing and including a hollow shank having a cylindrical portion terminating in close proximity to the valve seat, a ball valve normally resting upon said seat and guided by the cylindrical hollow portion, said casing including a depending flange surrounding the valve seat and a portion of said flange being cut away to provide spaced ears, a float, a lever connected with one end of the float, and pivotally connected intermediate its ends with said ears, the inner end of said lever being formed into an upwardly curved operating finger which is movable through the port in the valve seat and engageable with said valve for opening it under predetermined conditions.

In testimony whereof I affix my signature.

OSCAR O. ANDERSON.